United States Patent [19]

Strawczynski et al.

[11] Patent Number: 4,920,565
[45] Date of Patent: Apr. 24, 1990

[54] METHOD FOR CONNECTION OF SECURE CONFERENCE CALLS

[75] Inventors: Leo Strawczynski, Ottawa; David G. Steer, Nepean, both of Canada

[73] Assignee: Northern Telecom Limited, Montreal, Canada

[21] Appl. No.: 220,190

[22] Filed: Jul. 18, 1988

[51] Int. Cl.⁵ .............................................. H04L 9/04
[52] U.S. Cl. .......................................... 380/6; 380/9; 380/33
[58] Field of Search ....................... 380/6, 8, 9, 33, 34

[56] References Cited

U.S. PATENT DOCUMENTS

| | | | |
|---|---|---|---|
| 1,852,727 | 4/1932 | van der Horst | 380/33 |
| 2,586,475 | 2/1952 | Milliquet | 380/33 |
| 3,054,857 | 9/1962 | Weiss | 380/33 |
| 3,089,921 | 5/1963 | Hines | 380/33 |
| 3,204,034 | 8/1965 | Ballard et al. | 380/33 |
| 4,802,220 | 1/1989 | Marker, Jr. | 380/33 |
| 4,805,216 | 2/1989 | Gruenberg | 380/33 |
| 4,815,128 | 2/1989 | Malek | 380/9 |
| 4,845,749 | 7/1989 | Brickell et al. | 380/9 |

Primary Examiner—Salvatore Cangialosi
Attorney, Agent, or Firm—Jean-Pierre Fortin

[57] ABSTRACT

The present invention provides a method and apparatus of making secure conference calls in which the bridging unit does not need to know any encryption keys and can function independently of the encryption process used by the communicating parties. This means that there is no security requirement for the conference unit, there are fewer restrictions on where it can be placed, and it does not introduce any additional weaknesses in the security system.

51 Claims, 5 Drawing Sheets

METHOD FOR CONNECTION OF SECURE CONFERENCE CALLS

FIELD OF THE INVENTION

This invention relates to audio teleconferencing but more particularly to a secure conference network and method of connection thereof.

BACKGROUND OF THE INVENTION

One service that is required in a communication network is audio teleconferencing. This service allows a number of callers to talk together from a number of separated telephone instruments. In a secure conference call, two additional features are provided. The speech passed between the parties is encrypted, using keys known only to the sender and the receiver, so that the speech is not understandable by any eavesdropper who intercepts the call. In addition the parties in communication are authenticated so that each is assured of the identity and clearance level of the others.

To provide the conference feature, a bridge circuit is often employed. This circuit combines the signals from all parties and distributes the results to each listener. Unfortunately when the speech is encrypted the bridge circuit can no longer sum the signals as the encryption is typically a non-linear process.

In past implementations of secure conference circuits, the bridge would first decrypt the incoming signals, then sum the resulting clear speech, then encrypt the result and distribute it to all parties in the conference. This method requires the bridge circuit to know the encryption keys for all parties and clear speech signals are contained within the unit. This means that the conference bridge itself must be considered as a part of the security system. This introduces another point of weakness in the system and some users may not wish to trust the security of a bridge operating outside their direct control. It is thus desirable to make a conference unit that can operate without requiring recourse to clear speech.

Another approach to this problem has been described in a paper by Brickell et al. CRYPTO '87 Proceedings, entitled "Secure Audio Teleconference". In this method, an encryption process is used with certain linear properties which allows the bridge circuit to sum the signals in a normal manner for distribution. Unfortunately this limits the number of applicable encryption techniques and not all users would be willing to trust these schemes. This method also restricts the speech coding techniques allowed, produces some bandwidth expansion, and requires some synchronization (in time) of the signals from all of the conferees.

It is thus desirable to design a method and apparatus which can function independently of the encryption process being used and also does not suffer from the above mentioned limitations.

SUMMARY OF THE INVENTION

The primary object of the present invention is to provide a method and apparatus of making secure conference calls in which the bridging unit does not need to know any encryption keys and can function independently of the encryption process used by the communicating parties. This means that there is no security requirement for the conference unit, there are fewer restrictions on where it can be placed, and it does not introduce any additional weaknesses in the security system.

DESCRIPTION OF THE DRAWINGS

Particular embodiments of the invention will be understood in conjunction with the accompanying drawings in which.

DESCRIPTION OF THE PREFERRED EMBODIMENT

Figure 1:
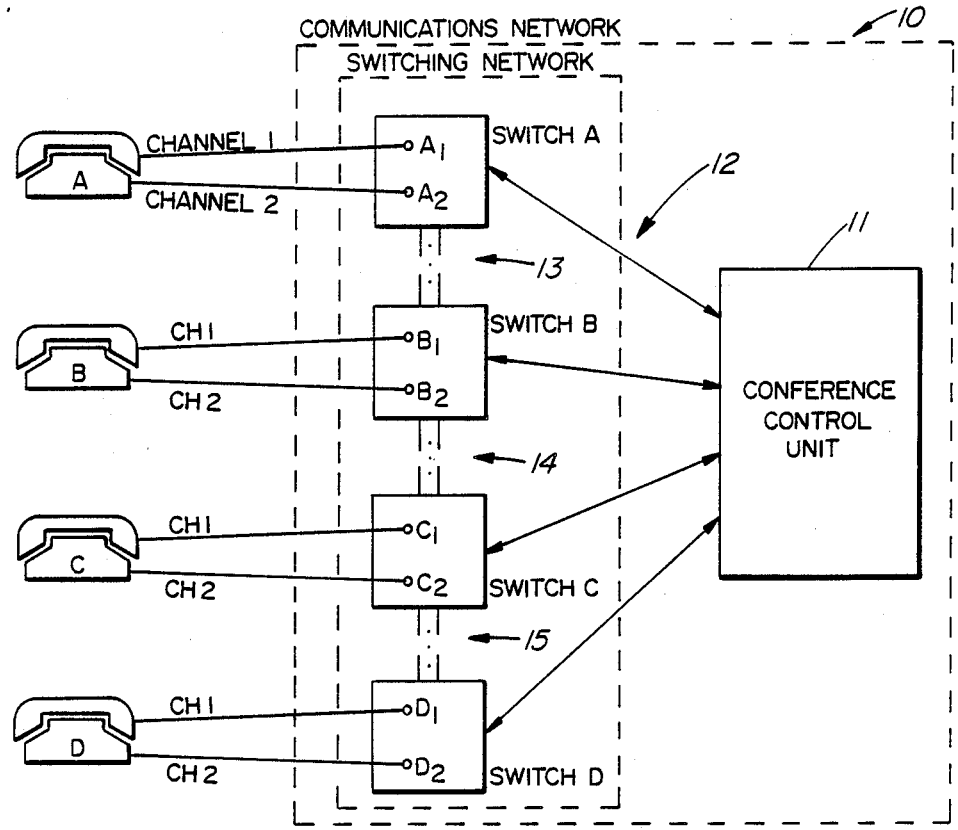
FIG. 1 is an illustrative block diagram of a secure conference system according to a first embodiment of the present invention.

Referring now to FIG. 1, we have shown generally at reference numeral 10 an illustrative block diagram of the conference system of the present invention. The system is basically comprised of a conference control unit 11, a number of telephone sets A, B, C, and D and a switching network 12. Each telephone set has two channels for connection to the switches. These channels may be multiplexed on a single physical connection. The network 12 may consist of a number of nodes or switching centers connected by transmission facilities. End to end digital connectivity should be provided through the use of the digital subscriber access technology and a digital network or an analog network combined with voice band modems.

For example, in FIG. 1, switching network 12 is comprised of telephone switches A, B, C and D. Each switch may be connected to another switch by means of trunk lines 13, 14 and 15. In FIG. 1, telephone sets A, B, C and D are each connected to their own switch, i.e. switch A, B, C and D. However, it will be known to those knowledgeable in the art that a number of telephone sets within the teleconference network may be interconnected via the same switch. The number of switches will of course depend on the location of teleconference users. For example, sets A and B could be interconnected via the same switch if these are located in the same office or local area network. These switches can be any typical telephone switches supporting digital loops on voice band data modems such as the DMS-100 (trademark) switch.

A DMS-100 is currently adaptable to provide the conference control unit.

In FIG. 1, four parties are connected in a teleconference network. However, any number of parties can be connected in a similar manner. To form the conference, the parties are connected together by means of the switching network 12 under the control of the conference control unit 11. This connection pattern is established by having a first party initiate the conference call feature. In this example, channel 2 of phone A connects to channel 1 of phone B, channel 2 of phone B connects to channel 1 of phone C, and channel 2 of phone C connects to channel 1 of phone D, see FIG. 2. Note that channel 1 of phone A and channel 2 of phone D are not used. As the channels to each phone are interchangeable, the designations channel 1 and channel 2 could be reversed on the phones without affecting the operation of the system. Once this connection pattern has been established, each phone can then initiate a secure call with a connected neighbor using the encryption process of their own choice. Once the secure calls are established on each channel the signal processing circuits of phones B and C will operate to combine the speech from each active channel and the user speech and to distribute it to other channels and the user. The speech or messages from each phone user is thus heard at all other phones in the conference. The voice from phone A, for example, is heard at phone D after passing though phones B and C.

Because of the digital techniques used in the switching network and the transmission lines, there will be no practical accumulation of noise to degrade the speech signal. Quantization noise does not accumulate with successive codings in the chain if conferencing and coding functions are partitioned properly. This results in synchronous coding at each station and is practical with the common pulse code modulation (PCM), adaptive differential PCM (ADPCM) and the CCITT standard wide band audio (WBA) coding schemes.

The telephone sets in this arrangement are connected to the network in the manner of ordinary telephone sets. However, in the most practical arrangement, digital communication techniques are used for access, transmission and switching. The method can still be applied to an analog or a mixed analog/digital switching/transmission network if suitable low bit rate speech coding and voice band data modems are employed to provide digital signals for use by the secure telephone sets. Note that these modems can be incorporated within the secure telephone sets to permit the conference method to operate on either analog or digital networks.

Figure 2:
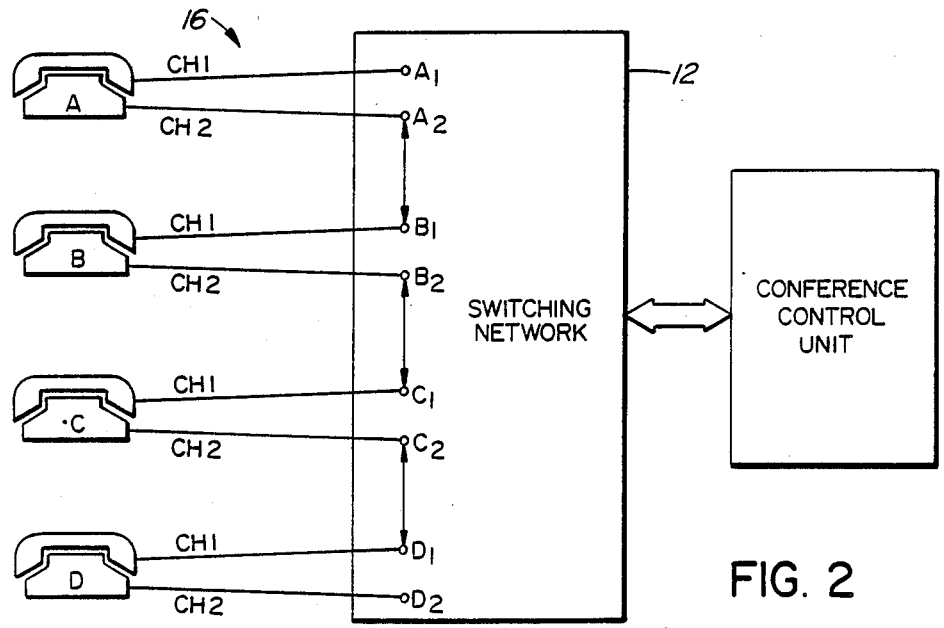
FIG. 2 is an illustrative block diagram of the conference system of FIG. 1 according to a further embodiment of the present invention.
Figure 6:
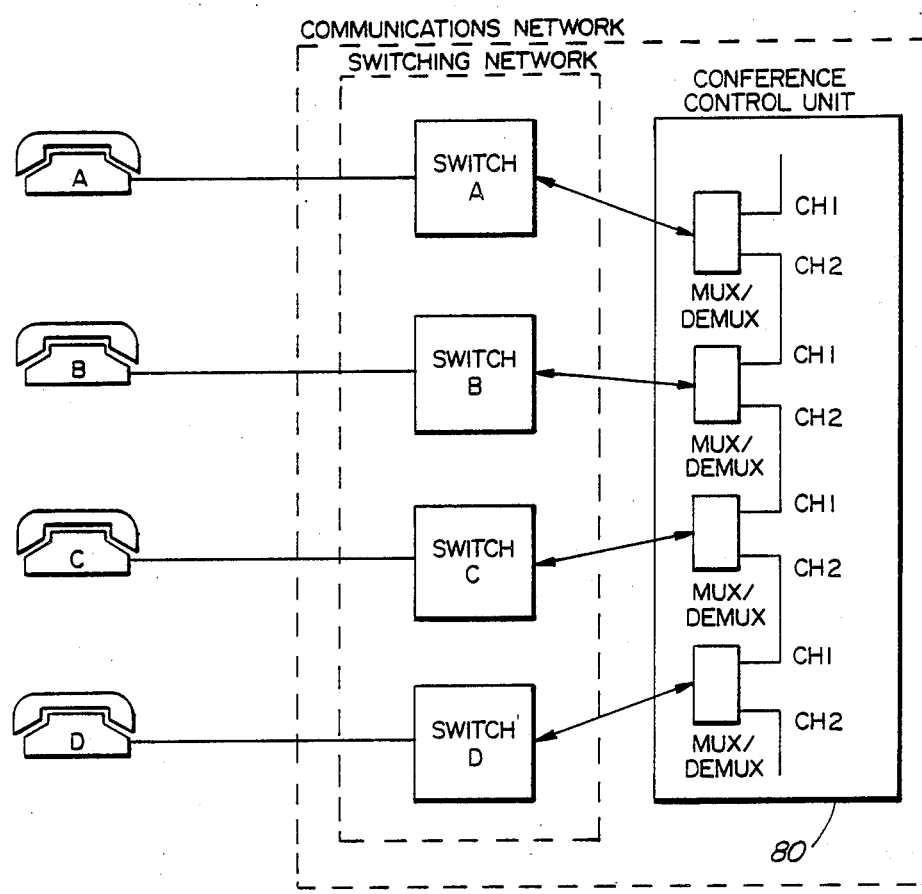
FIG. 6 is a block diagram of an alternate conference network according to another embodiment of the present invention.

The conference control unit 11 acts to set up and supervise the interconnection between the secure telephones to form the conference. The role of the conference control unit 11 is to request connections in the switching network 12. No processing of speech by the conference unit or by the network is needed. The secure conference feature is made possible by having each secure telephone set connected to the switching network 12 with two or more logical channels depicted generally at reference numeral 16. This may be done practically in a number of ways. It is possible to simply use two pairs of wires for each set and then make two network connections as shown in FIGS. 1 and 2. It is also possible to combine two logical communication channels on a single pair of wires or network connection by the use of speech coding techniques which multiplex a number of channels as shown in FIG. 6.

ISDN (Integrated Services Digital Network), for example, supports two full speech channels (64 Kb/s each) and one data channel (16 Kb/s) for a total of 144 Kb/s on a single standard telephone wire pair. ISDN thus directly supplies two logically separate speech channels on a single subscriber pair.

Figure 3:
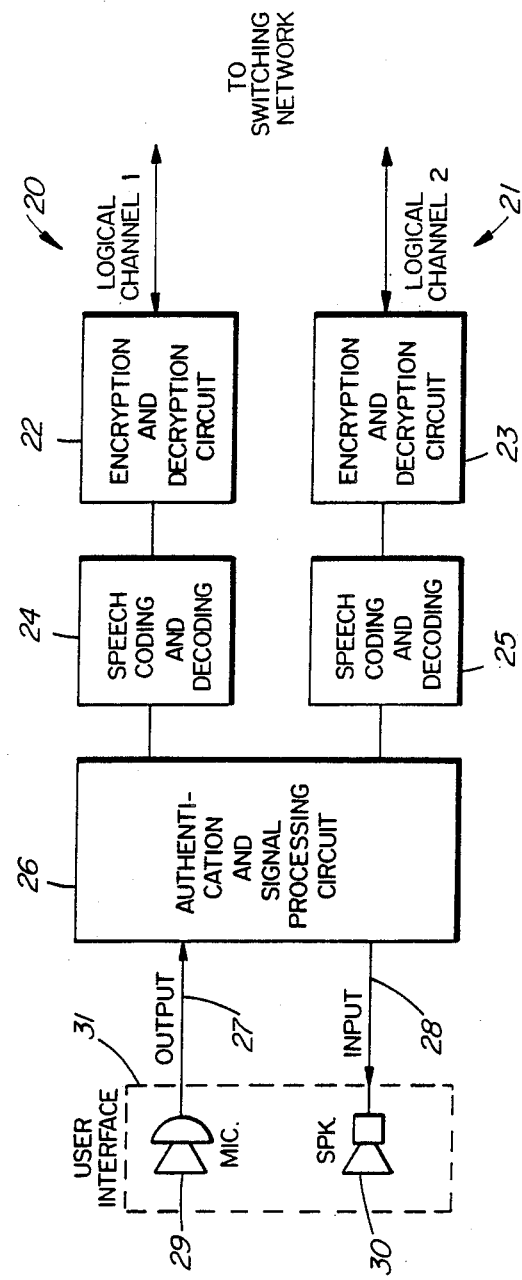
FIG. 3 is a block diagram of a secure telephone set used in the secure teleconference network of the present invention.

Referring now to FIG. 3, we have shown a block diagram of a secure telephone set used with the teleconference system of FIGS. 1 and 2. In this embodiment, the two logical connections 20 and 21 from the set to the switching network 12 are labelled channel 1 and channel 2 respectively. These channels are connected to encryption/decryption circuits 22 and 23 respectively. These are used to encrypt the messages or speech sent and decrypt those received over each logical communications channel.

A description of speech encryption/decryption techniques which may be used with this invention is disclosed in a paper by W. Diffie et al., Third Annual Symposium on Physical/Electronic Security, August 1987, entitled "Secure Communications with the Integrated Services Digital Network (ISDN)".

The encryption/decryption circuits 22 and 23 are connected to speech coding/decoding circuits 24 and 25, respectively. These may operate under any suitable coding scheme. Although some coding schemes may result in excessive coding delay, there are practical coding schemes, notably companded PCM, ADPCM, and the CCITT wideband audio standard, where the coding delay is insignificant.

The two coding/decoding circuits 24 and 25 are connected to an authentication, control and signal processing circuit 26 (ACSP). This circuit performs several functions. One operation is to connect the user output and input signals 27 and 28 of the microphone 29 and speaker 30 forming part of user interface 31, to the communication channels via encryption circuits 22 and 23. The circuit also acts to perform the security authentication tasks, to activate the encryption circuits 22 and 23 and to provide them with encryption keys.

The ACSP circuit 26 can perform signal processing tasks involving the speech decoded from the two logical communication channels 20 and 21 and user interface 31. This signal processing involves, for example, summing the decoded speech and presenting the sum to the user interface 31 to be heard over speaker 30. The signal from the user interface would be monitored with a speech detector. U.S. Pat. No. 4,410,763 which issued to applicant describes such a speech detector. If the detector determines the signal to be speech, then this signal would be summed with the signals sent to the communications channels. These three summing operations form a simple three-party conference bridge.

Figure 4:
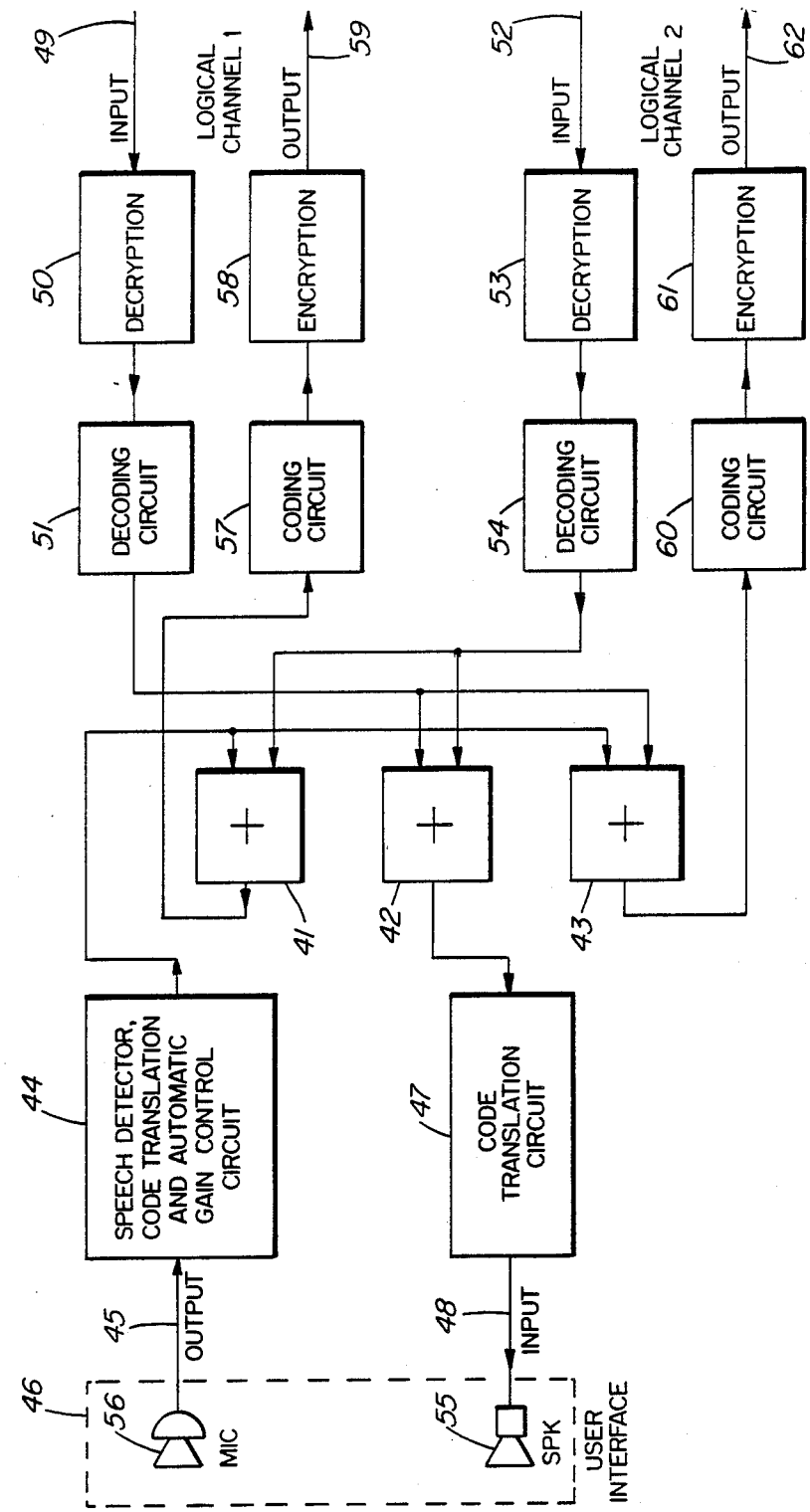
FIG. 4 is a block diagram of the signal processing operation used in the secure telephone set of FIG. 3.

The operations discussed above performed by the circuits 22 through 26 are illustrated in FIG. 4. The ACSP circuit consists of three adders 41, 42 and 43, a speech detector, code translation and automatic gain control circuit 44 connected at the output 45 of the user interface 46 and a code translation circuit 47 connected at the input 48 of the user interface.

The incoming signal received at the input 49 of logical channel 1 is first decrypted at decryption circuit 50 and then decoded at decoding circuit 51. Similarly, the incoming signal received at the input 52 of logical channel 2 is first decrypted at decryption circuit 53 and then decoded at decoding circuit 54. The resulting linear speech signals received from channels 1 and 2 are forwarded to adder 42. The sum is presented to the input 48 of user interface 46 through code translation circuit 47 to be heard on speaker 55. The translation of signals may be required if for example, the unit uses a mu-law codec, then the linear sum will need to be mu-law encoded before being sent to the codec to drive loudspeaker 55. Similarly the output 4 from microphone 56 would need to be translated to linear form by code translation circuit 44 if, for example, a mu-law codec was used.

Adder 41 is used to add the speech signal from input 52 of channel number 2 with a speech signal detected from the output 45 of user interface 46. If the speech detecting circuit 44 detects a speech signal, it is summed by adder 41 with the incoming speech signal received at the input 52 of logical channel 2 and presented first to coding circuit 57 and then to encryption circuit 58 for transmission at output 59 of logical channel 1. Similarly, adder 43 will add a detected speech signal from microphone 56 with an incoming speech signal received from input 49 of logical channel 1. The sum will be coded and accepted by circuits 60 and 61 respectively and appear as the outgoing signal at output 62 of logical channel 2. The automatic gain control circuit 44 would be used to adjust the signal level of the speech from the microphone 56 to attain a uniform volume level for the conference.

The use of automatic gain control (AGC) in teleconferencing is described in a paper by John Ellis and Bruce Townsend in TELESIS 1987 ONE, pages 23–31, entitled "Conference Bridge: State of the Art in Teleconferencing".

If speech coding is being used, and the speech detector indicates no user input from microphone 56, then the signals from the channels need not be decoded and recoded to be passed between channels.

In some cases different speech coding rules may be used by different sets that wish to be included in a conference. For example, some phones may use mu-law PCM speech coding while others may use A-law PCM coding. These different terminal types could be accommodated in this conference method in the following way. In FIG. 1, if telephone sets A and B used the mu-law coding technique and telephone sets C and D used the A-law coding technique, then they would be connected as shown with groups of like terminals connected together. Telephone set C (or possibly telephone set B) will then operate its signal processing circuit to perform a translation between the two coding types as part of its conference summing operations. The separate parts of the conference are thus able to communicate with the other through the translation capabilities of one of the telephone sets.

Perhaps some terminals may use the CCITT wide band audio standard. This audio standard is described in a paper by P. Mermelstein in IEEE Communications, Volume 26, No. 1, Jan. 88, and is entitled "A New CCITT Coding Standard for Digital Transmission of Wideband Audio Signals".

In a wide band audio terminal application, the code translation circuits 44, 47 of FIG. 4 would include the analysis and synthesis quadrature mirror filters (QMF). The coding/decoding circuits 51, 54, 57, 60 handle the low sub-band and high sub-band components. The pair of low and high band components of the signal are summed separately. This method is preferable to avoid accumulation of delay in QMF filters and to prevent accumulation of quantization noise.

When mixing narrow band and wide band terminals, the narrow band terminals should first be converted to wide band.

Figure 5:
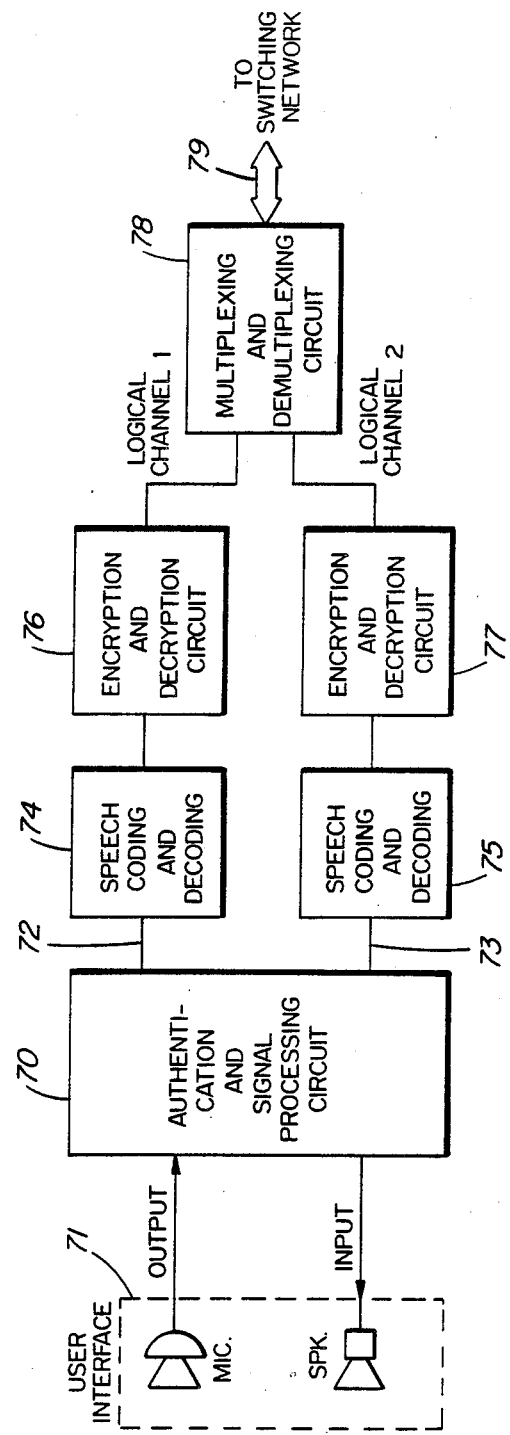
FIG. 5 is an illustrative block diagram of a secure telephone set according to a second embodiment of the present invention.

Referring now to FIG. 5, we have shown an illustrative block diagram of a secure telephone set according to a second embodiment of the present invention. In particular, this set can be used when a single physical connection is used to connect the telephone set to the switching network. In this embodiment, an ACSP circuit 70 is connected to user interface 71 and the two speech channels 72 and 73 are connected to speech coding/decoding circuits 74 and 75. These are connected to encryption/decryption circuits 76 and 77 respectively, to permit the encryption of the two speech channels.

Once coded and encrypted, the logical channels can then be combined by means of a multiplexing circuit 78 and forwarded to a switching network via a single communication path 79.

For example, this could involve using the CCITT ADPCM algorithm in the coder/decoder 74, 75 to provide two 32 Kb/s speech signals which can be combined by multiplexer 78 (after encryption) onto one standard 64 Kb/s channel. Using multiplexing techniques of this sort permits the secure phone and the conference feature to be implemented easily within the existing communications networks.

Referring now to FIG. 6, we have shown an illustrative block diagram of an alternate conference network for use with the secure telephone set of FIG. 5. In particular, each set is connected to a switch via a single access channel. In this arrangement, the role of the conference control unit 80 also includes the demultiplexing of each input channel into two logical channels and the redistribution and multiplexing of these among the participants. For example a single 64 Kb/s channel would demultiplex into two 32 Kb/s logical channels.

In principle, it is possible for one encryption process to be used, for example, between phones A and B, but a different process could be used between B and C if they so choose (see FIG. 1). This permits flexibility in the types of terminals used with the system. Also it can be noted that if a symmetric key encryption technique is being used, it is possible to use different encryption keys on each segment of the conference circuit. If this is done, then the bit patterns on the two channels to a secure telephone set will be different even if the user has no input i.e. is not speaking. An eavesdropper would thus be unable to determine which party of the conference is speaking. This may be considered an additional security feature by some users. Otherwise it is most practical for all segments of the conference to be encrypted with the same key. As the entire conference can be decoded by breaking the cryptosystem on any one link between users, there is no advantage in having separate keys for each link.

With this arrangement, the clear text or speech appears only at the telephone sets where it must appear anyway for the user. Thus there is no additional security weakness in the system due to the presence of the conference feature. The conference control unit 11 is responsible for administering the connections between the parties but it does not need to know any encryption keying information or operate on any clear text. The encryption and authentication process is all under the direct control of the user's secure telephones and they need not trust the conference unit with any of their security information.

With this method, if one party wishes to drop out of the conference, then it is the responsibility of the conference control unit 11 to reconnect the remaining parties by instructing the communication and switching network 12. For example, in FIG. 2, if phone C wished to drop out of the conference, then the conference unit would instruct the network to reconnect channel 2 of phone B to channel 1 of phone D. These two phones would then reinitiate a secure call between themselves, after this was established, the conference could continue among the remaining phones i.e. phones A, B and D.

If another party wished to be included in the conference, then the conference unit would instruct the network to connect channel 2 of phone D to channel 1 of the new party. These two phones would then initiate a secure call and the new party would be included in the conference.

As is customary in conference calls, one party or an operator, acts as a controller to administer the conference and issue the instructions to the conference unit to include or remove parties from the conference. This conference manager would communicate with the conference control unit using a separate logical communication channel established between the manager and the conference unit. As an option, this communication channel could be secure. The conference manager would also be responsible for authenticating the identities of all participants in the conference and perhaps also distributing the identities of the participants to all of the conferees. A number of techniques known in the art can be used for this and need not be discussed further. Other techniques can also be used in which every party performs his own authentication of every other party in the conference.

A secure conference network could also be provided by interconnecting users through two or more conference control units in geographically separated regions.

What is claimed is:

1. A method of bridging teleconference calls at each telephone set used within a teleconference network, comprising the steps of:
   receiving a first incoming signal from a first adjacent teleconference user via a first logical channel;
   decoding said first incoming signal to provide a first incoming speech signal;
   forwarding said first incoming speech signal to a first input of a signal processing circuit means;
   receiving a second incoming signal from a second adjacent teleconference user via a second logical channel;
   decoding said second incoming signal to provide a second incoming speech signal;
   forwarding said second incoming speech signal to a second input of said signal processing circuit means;
   detecting the presence of and decoding a user's output speech signal from an output of user interface means;
   forwarding said output speech signal if present to a third input of said signal processing circuit means;
   summing said speech signals of said first and second inputs at said signal processing means and forwarding the summed signal to an input of code translation circuit means for conversion and forwarding to an input of said user interface means;
   summing said speech signals of said second and third inputs at said signal processing means to provide a first outgoing speech signal;
   coding said first outgoing speech signal to provide a first outgoing signal;
   transmitting said first outgoing signal to said first adjacent user via said first logical channel;
   summing said speech signals of said first and third inputs at said signal processing circuit means to provide a second outgoing speech signal;
   coding said second outgoing speech signal to provide a second outgoing signal; and
   transmitting said second outgoing signal to said second adjacent user via said second logical channel.

2. A method as defined in claim 1 further comprising the step of instructing said communications network having switching nodes and transmission links to establish a chain-like connection pattern between said teleconference users such that each telephone set is connected to an adjacent set allowing each user to communicate with an adjacent user.

3. A method as defined in claim 2 wherein said communications network is instructed to establish a chain-like connection pattern between said teleconference users by connecting the telephone set of a user to a telephone set of a first adjacent teleconference user via a first logical channel and to the telephone set of a second adjacent teleconference user via a second logical channel.

4. A method as defined in claim 3 further comprising the steps of encrypting the transmitted calls of each of said first and second logical channels, thereby providing an outgoing secure call from one user to each adjacent user and decrypting each incoming secure call once received at each user via said first and second logical channels, such that a secure teleconference network is provided between teleconference users.

5. A method of providing a teleconference call between a number of users, comprising the steps of:
   instructing a communications network having switching nodes and transmission links to establish a chain-like connection pattern between said users, by connecting the telephone set of a user to the telephone set of a first adjacent user via a first logical channel and to the telephone set of a second adjacent user via a second logical channel;
   receiving a first incoming signal from a first adjacent teleconference user via a first logical channel;
   decoding said first incoming signal to provide a first incoming speech signal;
   forwarding said first incoming speech signal to a first input of a signal processing circuit means;
   receiving a second incoming signal from a second adjacent teleconference user via a second logical channel;
   decoding said second incoming signal to provide a second incoming speech signal;
   forwarding said second incoming speech signal to a second input of said signal processing circuit means;
   detecting the presence of and decoding a user's output speech signal from an output of user interface means;
   forwarding said output speech signal if present to a third input of said signal processing circuit means;
   summing said speech signals of said first and second inputs at said signal processing means and forwarding the summed signal to an input of code translation circuit means for conversion and forwarding to an input of said user interface means;
   summing said speech signals of said second and third inputs at said signal processing means to provide a first outgoing speech signal;
   coding said first outgoing speech signal to provide a first outgoing signal;
   transmitting said first outgoing signal to said first adjacent user via said first logical channel;
   summing said speech signals of said first and third inputs at said signal processing circuit means to provide a second outgoing speech signal;
   coding said second outgoing speech signal to provide a second outgoing signal; and transmitting said second outgoing signal to said second adjacent user via said second logical channel.

6. A method as defined in claim 5 further comprising the steps of encrypting the transmitted calls of each of said first and second logical channels, thereby providing an outgoing secure call from one user to each adjacent user and decrypting each incoming secure call once received at each user via said first and second logical channels, such that a secure teleconference network is provided between teleconference users.

7. A method of bridging teleconference calls at each telephone set used within a secure teleconference network, comprising the steps of:
 receiving a first incoming secure signal from a first adjacent teleconference user via a first logical channel;
 decrypting said first incoming secure signal;
 decoding said decrypted first incoming signal to provide a first incoming speech signal;
 forwarding said first incoming speech signal to a first input of a signal processing circuit means;
 receiving a second incoming signal from a second adjacent teleconference user via a second logical channel;
 decoding said second incoming signal to provide a second incoming speech signal;
 forwarding said second incoming speech signal to a second input of said signal processing circuit means;
 detecting the presence of and decoding a user's output speech signal from an output of user interface means;
 forwarding said output speech signal if present to a third input of said signal processing circuit means;
 summing said speech signals of said first and second inputs at said signal processing means and forwarding the summed signal to an input of code translation circuit means for conversion and forwarding to an input of said user interface means;
 summing said speech signals of said second and third inputs at said signal processing means to provide a first outgoing speech signal;
 coding said first outgoing speech signal to provide a first outgoing signal;
 encrypting said first outgoing signal to provide a first outgoing secure signal;
 transmitting said first outgoing secure signal to said first adjacent user via said first logical channel;
 summing said speech signals of said first and third inputs at said signal processing circuit means to provide a second outgoing speech signal;
 coding said second outgoing speech signal to provide a second outgoing signal;
 encrypting said second outgoing signal to provide a second outgoing secure signal; and
 transmitting said second outgoing secure signal to said second adjacent user via said second logical channel.

8. A method as defined in claim 7 further comprising the step of instructing a communications network having switching nodes and transmission links to establish a chain-like connection pattern between said teleconference users such that each telephone set is connected to an adjacent set allowing each user to communicate with an adjacent user.

9. A method as defined in claim 8 wherein said communications network is instructed to establish a chain-like connection pattern between said teleconference users by connecting the telephone set of a user to a telephone set of a first adjacent teleconference user via said first logical channel and to the telephone set of a second adjacent teleconference user via said second logical channel.

10. A method of providing a secure teleconference call between a number of users, comprising the steps of:
 instructing a communications network having switching nodes and transmission links to establish a chain-like connection pattern between said users, thereby allowing each user to communicate with an adjacent user;
 receiving a first incoming secure signal from a first adjacent teleconference user via a first logical channel;
 decrypting said first incoming secure signal;
 decoding said decrypted first incoming signal to provide a first incoming speech signal;
 forwarding said first incoming speech signal to a first input of a signal processing circuit means;
 receiving a second incoming signal from a second adjacent teleconference user via a second logical channel;
 decoding said second incoming signal to provide a second incoming speech signal;
 forwarding said second incoming speech signal to a second input of said signal processing circuit means;
 detecting the presence of and decoding a user's output speech signal from an output of user interface means;
 forwarding said output speech signal if present to a third input of said signal processing circuit means;
 summing said speech signals of said first and second inputs at said signal processing means and forwarding the summed signal to an input of code translation circuit means for conversion and forwarding to an input of said user interface means;
 summing said speech signals of said second and third inputs at said signal processing means to provide a first outgoing speech signal;
 coding said first outgoing speech signal to provide a first outgoing signal;
 encrypting said first outgoing signal to provide a first outgoing secure signal;
 transmitting said first outgoing secure signal to said first adjacent user via said first logical channel;
 summing said speech signals of said first and third inputs at said signal processing circuit means to provide a second outgoing speech signal;
 coding said second outgoing speech signal to provide a second outgoing signal;
 encrypting said second outgoing signal to provide a second outgoing secure signal; and
 transmitting said second outgoing secure signal to said second adjacent user via said second logical channel.

11. A method as defined in claim 10 wherein said communications network is instructed to establish a chain-like connection pattern between said teleconference users by connecting the telephone set of a user to a telephone set of a first adjacent teleconference user via said first logical channel and to the telephone set of a second adjacent teleconference user via said second logical channel.

12. A method of bridging teleconference calls at each telephone set used within a teleconference network, comprising the steps of:

receiving an incoming call having multiplexed first and second signals from a communications network having switching nodes and transmission links;

demultiplexing said incoming call to provide said first and second signals;

decoding said first and second calls to provide first and second incoming speech signals;

summing said first and second incoming speech signals and forwarding the sum to a user interface;

detecting the presence of an output speech signal from said user interface;

summing said first incoming speech signal with said output speech signal to provide a first outgoing speech signal;

summing said second incoming speech signal with said output speech signal to provide a second outgoing speech signal;

coding said first and second outgoing speech signals to provide first and second outgoing signals;

multiplexing said first and second outgoing signals; and transmitting said multiplexed outgoing signals via a channel to said communications network for connection to other teleconference users.

13. A method as defined in claim 12 further comprising the steps of encrypting said first and second outgoing signals, thereby providing first and second outgoing secure signals and decrypting first and second incoming secure signals, such that a secure teleconference network is provided between teleconference users.

14. A method as defined in claim 13 further comprising the steps of:

instructing conference control means to demultiplex said transmitted outgoing signals from each of said teleconference user once received at said communications network to provide a first and second signal;

instructing conference control means to establish a chain-like connection pattern with said first and second signals, between said teleconference users, such that each telephone set is connected to an adjacent set allowing each user to communicate with an adjacent user;

multiplexing said first and second signals that have been channelled for a particular teleconference user; and transmitting said multiplexed signals to said particular teleconference user via said communications network.

15. A telephone set useable for bridging conference calls when used within a teleconference network, comprising:

means for decoding a first incoming signal to provide a first incoming speech signal;

means for decoding a second incoming signal to provide a second incoming speech signal;

user interface means having an input and an output;

means for detecting the presence of and decoding a user's output speech signal from the output of said user interface means;

signal processing circuit means having a first and a second input for receiving said first and second incoming speech signal and a third input for receiving said output speech signal;

first means at said signal processing means for summing said first and second speech signals to provide a first summed signal;

code translation circuit means for conversion of said first summed signal and for forwarding to the input of said user interface means;

second means at said signal processing means for summing said speech signals of said second and third inputs to provide a first outgoing speech signal;

first means for coding said first outgoing speech signal to provide a first outgoing signal for transmission to a first adjacent user;

third means at said signal processing means for summing said speech signals of said first and third inputs to provide a second outgoing speech signal; and second means for coding said second outgoing speech signal to provide a second outgoing signal for transmission to a second adjacent user.

16. A telephone set as defined in claim 15 wherein said decoding means is provided with a first and second input means for receiving a first and second incoming call from a first and second teleconference user via a first and second logical channel and a first and second output means for providing a first and second incoming speech signal.

17. A telephone set as defined in claim 16 wherein said coding means is provided with a first and second input means for receiving a first and second outgoing speech signal and a first and second output means for providing a first and second outgoing call for transmission to a first and second teleconference user via said first and second logical channels.

18. A telephone set as defined in claim 17 wherein said first summing means comprises a first adder adapted to add the incoming speech signals from said first and second outputs of said decoding means, said first adder having an output connected to the input of said user interface.

19. A telephone set as defined in claim 18 wherein said second summing means further comprises a second adder adapted to add the incoming speech signal from the first output of said decoding means to the outgoing speech signal of said user interface, said second adder having an output connected to the second input of said coding means for transmission from the second output thereof to said second teleconference user via said second logical channel.

20. A telephone set as defined in claim 19 wherein said summing means further comprises a third adder adapted to add the incoming speech signal from the second output of said decoding means to the outgoing speech signal of said user interface, said third adder having an output connected to the first input of said coding means for transmission from the first output thereof to said first teleconference user via said first logical channel.

21. A telephone set as defined in claim 20 further comprising switching network means for establishing a chain-like connection pattern between teleconference users, such that each user communicates with a user of an adjacent set, each input and each output of said decoding and coding means respectively, being connected to said network means.

22. A telephone set as defined in claim 21 further comprising conference control means for requesting, setting-up and supervising the interconnection of said teleconference users through said switching network means.

23. A telephone set as defined in claim 22 further comprising encrypting means connected at the output of said coding means for encrypting said outgoing call to provide an outgoing secure call and decrypting means connected at the input of said decoding means for decrypting an incoming secure call.

24. A teleconference network for interconnecting a number of telephone sets, comprising:
   communications network means having switching nodes and transmission links for establishing a chain-like connection pattern between said telephone sets, such that each teleconference user communicates with a user of an adjacent set;
   each telephone set being comprised of:
   means for decoding a first incoming signal to provide a first incoming speech signal;
   means for decoding a second incoming signal to provide a second incoming speech signal;
   user interface means having an input and an output;
   means for detecting the presence of and decoding a user's output speech signal from the output of said user interface means;
   signal processing circuit means having a first and a second input for receiving said first and second incoming speech signals and a third input for receiving said output speech signal;
   first means at said signal processing means for summing said first and second speech signals to provide a first summed signal;
   code translation circuit means for conversion of said first summed signal and for forwarding to the input of said user interface means;
   second means at said signal processing means for summing said speech signals of said second and third inputs to provide a first outgoing speech signal;
   first means for coding said first outgoing speech signal to provide a first outgoing signal for transmission to a first adjacent user;
   third means at said signal processing means for summing said speech signals of said first and third inputs to provide a second outgoing speech signal; and
   second means for coding said second outgoing speech signal to provide a second outgoing signal for transmission to a second adjacent user;
   and conference control means for requesting, setting-up and supervising interconnections of said telephone sets through said communications network means.

25. A teleconference network as defined in claim 24 wherein said decoding means is provided with a first and second input means for receiving a first and second incoming call from a first and second teleconference user via a first and second logical channel and a first and second output means for providing a first and second incoming speech signal.

26. A teleconference network as defined in claim 25 wherein said coding means is provided with a first and second input means for receiving a first and second outgoing speech signal and a first and second output means for providing a first and second outgoing call for transmission to a first and second teleconference user via said first and second logical channels.

27. A teleconference network as defined in claim 26 wherein said first summing means comprises a first adder adapted to add the incoming speech signals from said first and second outputs of said decoding means, said first adder having an output connected to the input of said user interface.

28. A teleconference network as defined in claim 27 wherein said second summing means further comprises a second adder adapted to add the incoming speech signal from the first output of said decoding means to the outgoing speech signal of said user interface, said second adder having an output connected to the second input of said coding means for transmission from the second output thereof to said second teleconference user via said second logical channel.

29. A teleconference network as defined in claim 28 wherein said third summing means further comprises a third adder adapted to add the incoming speech signal from the second output of said decoding means to the outgoing speech signal of said user interface, said third adder having an output connected to the first input of said coding means for transmission from the first output thereof to said first teleconference user via said first logical channel.

30. A teleconference network as defined in claim 29 further comprising encrypting means connected at the output of said coding means for encrypting said outgoing call to provide an outgoing secure call and decrypting means connected at the input: of said decoding means for decrypting an incoming secure call.

31. A telephone set useable for bridging secure teleconference calls when used in a teleconference network, comprising:
   means for decrypting a first incoming secure call from a first teleconference user to provide a first incoming signal;
   means for decoding said first incoming signal to provide a first incoming speech signal;
   means for decrypting a second incoming secure call from a second teleconference user to provide a second incoming signal;
   means for decoding said second incoming signal to provide a second incoming speech signal;
   user interface means having an input and an output;
   means for detecting the presence of and decoding a user's output speech signal from the output of said user interface means;
   signal processing circuit means having a first and a second input for receiving said first and second incoming speech signal and a third input for receiving said output speech signal;
   first means at said signal processing means for summing said first and second speech signals to provide a first summed signal;
   code translation circuit means for conversion of said first summed signal and for forwarding to the input of said user interface means;
   second means at said signal processing means for summing said speech signals of said second and third inputs to provide a first outgoing speech signal;
   first means for coding said first outgoing speech signal to provide a first outgoing signal;
   means for encrypting said first outgoing signal to provide an outgoing secure call for transmission to another teleconference user;
   third means at said signal processing means for summing said speech signals of said first and third inputs to provide a second outgoing speech signal;
   second means for coding said second outgoing speech signal to provide a second outgoing signal for transmission to a second adjacent user; and means for encrypting said second outgoing signal to provide an outgoing secure call for transmission to another teleconference user.

32. A telephone set as defined in claim 31 wherein said decrypting means is provided with a first and second input means for receiving a first and second incoming secure call from a first and second teleconference user via a first and second logical channel and a first and second output means for providing a first and second incoming call.

33. A telephone set as defined in claim 32 wherein said encrypting means is provided with a first and second input means for receiving a first and second outgoing call and a first and second output means for providing a first and second outgoing secure call for transmission to a first and second teleconference user via said first and second logical channels.

34. A telephone set as defined in claim 33 wherein said decoding means is provided with a first and second input means for receiving said first and second incoming calls from said first and second output means of said decrypting means and a first and second output means for providing a first and second speech signal.

35. A telephone set as defined in claim 34 wherein said coding means is provided with a first and second input means for receiving a first and second outgoing speech signal and a first and second output means connected to said first and second input means of said encrypting means for providing a first and second outgoing call.

36. A telephone set as defined in claim 35 wherein said first summing means comprises a first adder adapted to add the incoming speech signals from said first and second outputs of said decoding means, said first adder having an output connected to the input of said user interface.

37. A telephone set as defined in claim 36 wherein said second summing means further comprises a second adder adapted to add the incoming speech signal from the first output of said decoding means to the outgoing speech signal of said user interface, said second adder having an output connected to the second input of said coding means for transmission from the second output thereof to the second input of said encrypting means.

38. A telephone set as defined in claim 37 wherein said third summing means further comprises a third adder adapted to add the incoming speech signal from the second output of said decoding means to the outgoing speech signal of said user interface, said third adder having an output connected to the first input of said coding means for transmission from the first output thereof to the first input of said encrypting means.

39. A telephone set as defined in claim 38 further comprising communications network means having switching nodes and transmission links for establishing a chain-like connection pattern between teleconference users, such that each user communicates with a user of an adjacent set, each input and each output of said decoding and coding means respectively, being connected to said network means.

40. A telephone set as defined in claim 39 further comprising conference control means for requesting, setting-up and supervising the interconnection of said teleconference users through said communications network means.

41. A secure teleconference network for interconnecting a number of secure telephone sets, comprising:

communications network means having switching nodes and transmission links for establishing a chain-like connection pattern between said secure telephone sets, such that each teleconference user communicates with a user of an adjacent set;

each secure telephone set being comprised of:

means for decrypting a first incoming secure call from a first teleconference user to provide a first incoming signal;

means for decoding said first incoming signal to provide a first incoming speech signal;

means for decrypting a second incoming secure call from a second teleconference user to provide a second incoming signal;

means for decoding said second incoming signal to provide a second incoming speech signal;

user interface means having an input and an output;

means for detecting the presence of and decoding a user's output speech signal from the output of said user interface means;

signal processing circuit means having a first and a second input for receiving said first and second incoming speech signal and a third input for receiving said output speech signal;

first means at said signal processing means for summing said first and second speech signals to provide a first summed signal;

code translation circuit means for conversion of said first summed signal and for forwarding to the input of said user interface means;

second means at said signal processing means for summing said speech signals of said second and third inputs to provide a first outgoing speech signal;

first means for coding said first outgoing speech signal to provide a first outgoing signal;

means for encrypting said first outgoing signal to provide an outgoing secure call for transmission to another teleconference user;

third means at said signal processing means for summing said speech signals of said first and third inputs to provide a second outgoing speech signal;

second means for coding said second outgoing speech signal to provide a second outgoing signal for transmission to a second adjacent user;

means for encrypting said second outgoing signal to provide an outgoing secure call for transmission to another teleconference user;

and conference control means for requesting, setting-up and supervising the interconnections of said secure telephone sets through said communications network means.

42. A secure teleconference network as defined in claim 41 wherein said decrypting means is provided with a first and second input means for receiving a first and second incoming secure call from a first and second teleconference user via a first and second logical channel and a first and second output means for providing a first and second incoming call.

43. A secure teleconference network as defined in claim 42 wherein said encrypting means is provided with a first and second input means for receiving a first and second outgoing call and a first and second output means for providing a first and second outgoing secure call for transmission to a first and second teleconference user via said first and second logical channels.

44. A secure teleconference network as defined in claim 43 wherein said decoding means is provided with a first and second input means for receiving said first and second incoming calls from said first and second output means of said decrypting means and a first and second output means for providing a first and second speech signal.

45. A secure teleconference network defined in claim 44 wherein said coding means is provided with a first and second input means for receiving a first and second outgoing speech signal and a first and second output means connected to said first and second input means of said encrypting means for providing a first and second outgoing call.

46. A secure teleconference network as defined in claim 45 wherein said first summing means comprises a first adder adapted to add the incoming speech signals from said first and second outputs of said decoding means, said first adder having an output connected to the input of said user interface.

47. A secure teleconference network as defined in claim 46 wherein said second summing means further comprises a second adder adapted to add the incoming speech signal from the first output of said decoding means to the outgoing speech signal of said user interface, said second adder having an output connected to the second input of said coding means for transmission from the second output thereof to the second input of said encrypting means.

48. A secure teleconference network as defined in claim 47 wherein said third summing means further comprises a third adder adapted to add the incoming speech signal from the second output of said decoding means to the outgoing speech signal of said user interface, said third adder having an output connected to the first input of said coding means for transmission from the first output thereof to the first input of said encrypting means.

49. A telephone set useable for bridging conference calls when used in a teleconference network, comprising:
    means for demultiplexing an incoming call having multiplexed first and second signals received from a communications network having switching nodes and transmission links;
    means for decoding said first and second incoming signals to provide a first and second incoming speech signal;
    first means for summing said first and second incoming speech signals;
    user interface means having input means for receiving said incoming speech signals;
    means for detecting the presence of an outgoing speech signal from an output of said user interface means;
    second means for summing said first incoming speech signal with said outgoing speech signal to provide a first outgoing speech signal;
    third means for summing said second incoming speech signal with said outgoing speech signal to provide a second outgoing speech signal;
    means for coding said first and second outgoing speech signals to provide a first and second outgoing signal; and
    means for multiplexing said first and second outgoing signals for transmission via a logical channel to a switching network for channelling to another teleconference user.

50. A telephone set as defined in claim 49 further comprising means for encrypting said first and second outgoing signals, thereby providing first and second outgoing secure signals and means for decrypting first and second incoming secure signals, such that a secure teleconference network is provided between teleconference users.

51. A telephone set as defined in claim 50 further comprising:
    conference control means for demultiplexing said transmitted outgoing signals from each of said teleconference user once received at said switching network to provide a first and second network signal, for establishing a chain-like connection pattern of said network signals, between said teleconference users, such that each telephone set is connected to an adjacent set allowing each user to communicate with an adjacent user, for multiplexing network signals that have been channelled for a particular teleconference user, and for transmitting said multiplexed network signals to said particular teleconference user via said switching network.

* * * * *